Aug. 16, 1960
C. O. LARSON
2,949,140
QUICK ACTING CLAMP
Filed July 1, 1957
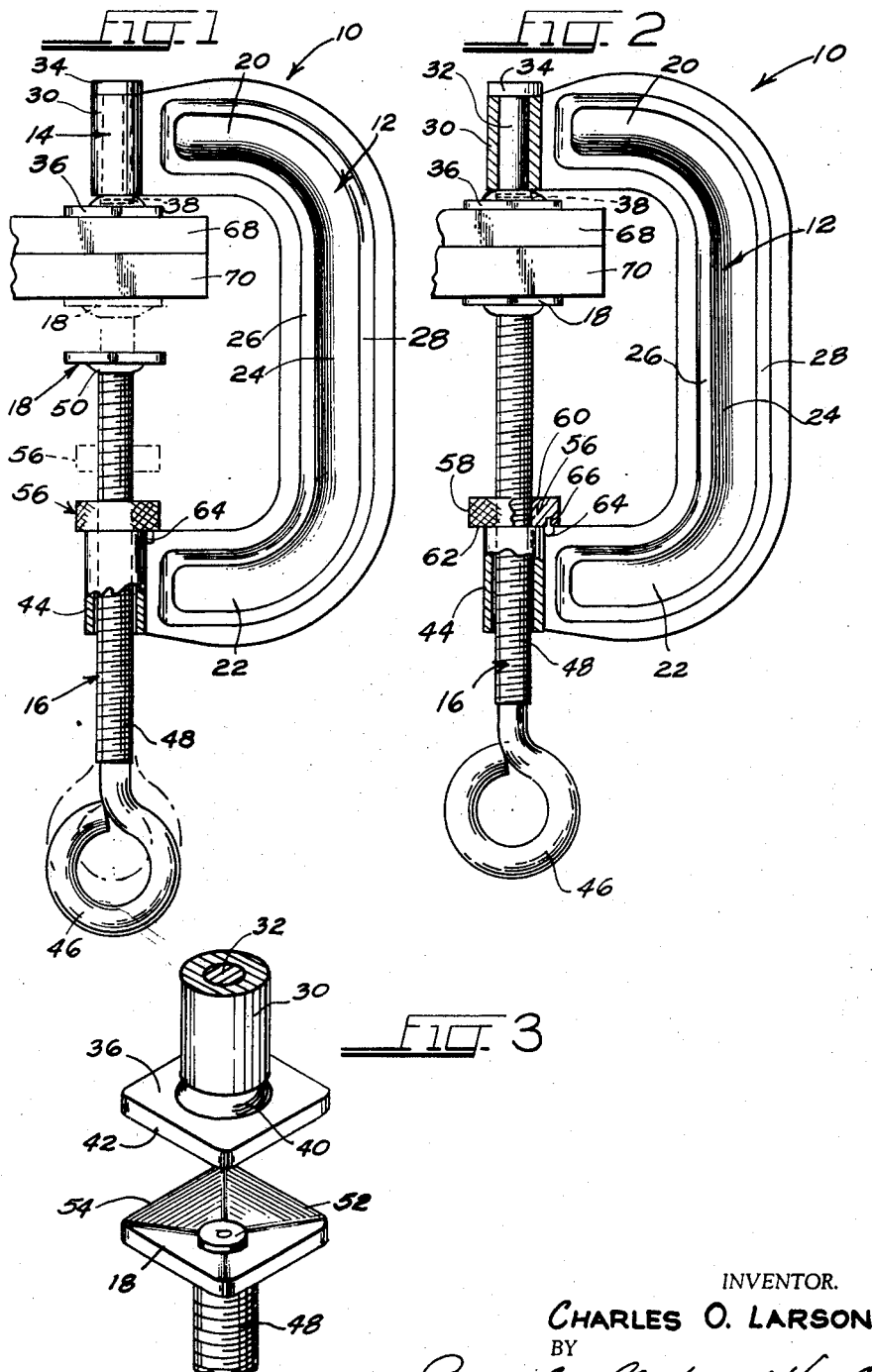
INVENTOR.
CHARLES O. LARSON
BY
Prangley, Clayton and Vogel
Att'ys.

United States Patent Office 2,949,140
Patented Aug. 16, 1960

2,949,140

QUICK ACTING CLAMP

Charles O. Larson, P.O. Box 358, Sterling, Ill.

Filed July 1, 1957, Ser. No. 669,330

2 Claims. (Cl. 144—305)

This invention relates to C-clamps and more particularly to quick acting C-clamps with improved article holding washers.

C-clamps of the type to which the present invention relates are normally utilized to clamp work pieces made of wood. Prior clamps of this type have utilized swivel washers as the work piece engaging members. The swivel washers have been made round. When such round swivel washers engage wood work pieces, they are satisfactory for their intended purpose provided that the opposed round washers are in alignment and provided that the support for the movable washer is true and has no wobble or play during tightening. As a practical matter C-clamps made by production methods have a slight play in the support for the movable clamping washer whereby the washer may wobble during tightening. As a result round washers under pressure tend to become misaligned whereby to provide an imperfect clamping action.

Accordingly, it is an important object of the invention to provide an improved C-clamp of the type set forth having improved clamping action.

Another object of the invention is to provide an improved C-clamp of the type set forth having improved work engaging members.

In connection with the foregoing object, it is yet another object of the invention to provide a C-clamp with work engaging members which are substantially self aligning in use whereby to tolerate slight play in the support for the movable work engaging member.

Still another object of the invention is to provide an improved clamping member structure of the type set forth in a quick acting C-clamp.

These and other objects and advantages of the invention will be better understood from the following description when taken in conjunction with the accompanying drawing. In the drawing wherein like reference numerals have been utilized to designate like parts throughout:

Figure 1 is a plan view of a C-clamp having an improved clamping member structure made in accordance with and embodying the principles of the present invention, the movable clamping member being shown in a retracted position in full lines and in the clamping position in dashed lines;

Figure 2 is a view similar to Figure 1 with certain portions broken away showing the movable clamping member in clamping position with the stop lug on the threaded nut in contact with the body of the C-clamp; and Figure 3 is an enlarged perspective view of the improved clamping members of the present invention.

There is shown in the drawing a C-clamp, generally designated by the numeral 10, made in accordance with and embodying the principles of the present invention.

C-clamp 10 includes a body 12, an anvil 14, and a threaded screw 16 which carries on its end a swivel washer 18 which is part of the improved clamping structure.

The body 12 is preferably formed from sheet metal by any suitable forming operation such as by stamping. The body 12 is shaped substantially like the letter C to provide a pair of arms 20 and 22 interconnected by a relatively straight connecting portion 24. The strength of body 12 is increased by providing therein a pair of interconnected strengthening ribs 26 and 28 which merge at their ends in arms 20 and 22.

There is carried on arm 20 an integral sleeve 30 which is substantially cylindrical in shape and may be formed by suitably shaping the material at the end of arm 20. Sleeve 30 receives therein the shank 32 of anvil 14. The upper end of shank 32 is provided with a head 34 having an outer diameter greater than that of shank 32 whereby to cooperate in holding shank 32 in operative position. One of the improved clamping members 36 is provided on the other end of shank 32 and is swivelly connected thereto for rotation thereabout.

More specifically, the lower end of shank 32 as viewed in Figure 2 extends through an aperture in the center of clamping member 36 and is provided with an enlargement 38 which serves rotatably to support washer 36 upon shank 32. This construction also serves to hold shank 32 within sleeve 30 but permits shank 32 to rotate within sleeve 30.

The clamping member or washer 36 is formed substantially square, as may be best seen from Figure 3, and is somewhat cup-shaped whereby to provide in the center an upstanding dome-shaped portion 40 which receives the end of shank 32 therethrough. The peripheral edges 42 of washer 36 facing outwardly from shank 32 include substantial straight portions and are adapted firmly to engage in a non-rotating manner the associated surface of a work piece.

Arm 22 also has a cylindrical sleeve 44 formed integral therewith. The axes of sleeves 30 and 44 are disposed in alignment and substantially parallel to the longitudinal axis of the connecting portion 24 of body 12. Sleeve 44 receives therein the threaded screw 16. More specifically, screw 16 is slidably disposed within sleeve 44 and is free to slide therein in a direction substantially parallel to the axes of sleeves 30 and 44. However, to facilitate the quick acting feature of clamp 10 to be described hereafter, the fit between sleeve 44 and screw 16 is loose whereby there is a slight play of screw 16 with respect to body 12 whereby to permit deviation between the axis of screw 16 and the aligned axes of sleeves 30—44.

There is provided on one end of screw 16 an integral eye or head portion 46 from which extends a threaded shank 48. Shank 48 is preferably formed with so called "fine series" thread instead of the standard or coarse thread to facilitate the quick acting clamping function as will be more fully described hereafter. The other end of threaded shank 40 rotatably carries the washer 18 which is the other clamping member and provides the other clamping surface for clamp 10. Washer 18 is formed substantially like washer 36. More specifically, washer 18 is generally square in shape and is provided centrally thereof with a dome-shaped portion 50 having an aperture in the center thereof. The associated end of shank 48 extends through the aperture in dome-shaped portion 50 and has the outer end provided with an enlargement or head 52 which serves swivelly to hold washer 18 upon shank 48. Washer 18 is free to swivel upon the end of shank 48 as well as to rotate thereon whereby to aid in insuring a firm clamping action against the work piece to be clamped. In addition the peripheral edges 54 of washer 18 which include substantial straight portions also aid in providing a non-slipping and non-rotating contact with an associated work piece to be clamped.

There is provided upon threaded shank 48 a cylindrical nut 56 which is internally threaded whereby threadedly to engage shank 48 of screw 16. The outer cylindrical surface 58 of nut 56 is knurled to provide a good gripping surface and is disposed between two substantially flat and parallel surfaces 60 and 62. Mounted upon nut 56 is a stop lug 64 having a shank 66 extending into nut 56 through surface 62 and substantially perpendicular thereto. Stop lug 50 extends in the general direction of the longitudinal axis of screw 16 and towards arm 22 of body 12. Stop lug 50 is also disposed radially outwardly from the axis of nut 56 a distance to permit clearance of the outer surface of sleeve 44 as can be best seen in Figures 1 and 2 of the drawing. Because of its positioning, stop lug 50 is adapted to contact the surface of arm 22 when nut 56 is rotated to the position illustrated in Figure 2 of the drawing.

The operation of C-clamp 10 will now be described as applied to the clamping of a pair of wooden work pieces 68 and 70. Work pieces 68 and 70 are first positioned against the clamping member or washer 36 on anvil 14 as illustrated in Figure 1 of the drawing. In order to permit such a positioning of work pieces 68 and 70, the screw 16 has been retracted to the position shown in full lines in Figure 1. It is to be understood that nut 56 can be rapidly moved along screw 16 by rotation thereabout provided nut 56 is positioned away from arm 22 whereby to disengage stop lug 64 therefrom.

After work pieces 68 and 70 have been positioned as shown in Figure 1, screw 16 and the parts thereon including washer 18 are moved to the position illustrated in dashed lines in Figure 1 by simply sliding screw 16 through sleeve 44. Nut 56 can then be quickly moved by rotating it about screw 16 using the knurled surface 58 until it is against sleeve 36 or until stop lug 64 contacts arm 22.

Washer 18 can then be moved into final engagement with the associated work piece 70 by turning screw 16 using the eye 46. Nut 56 is held from turning during rotation of screw 16 by the contact of stop lug 64 with arm 22. In this manner, washer 18 quickly can be tightened down against work piece 70 whereby firmly to clamp the work pieces between the clamping member or washer 36 of anvil 14 and the clamping member of washer 18.

An important feature of the present invention as compared with prior C-clamps and particularly such C-clamps utilizing the round clamping members in place of the clamping members 18 and 36 lies in the better gripping of the work pieces 68 and 70. For example, when utilizing round clamping members, the movable clamping member because of the slight play in the associated support screw tends to rotate or worm out of line with the opposed clamping member. However, in the present invention the peripheral edges 42 and 54 which contain straight portions and which for all practical purposes are square in shape stay in place upon the associated work pieces. The movable square washer 18 will not move or worm out of line even when there is play between screw 18 and sleeve 44. There is no tendency of the gripping edges 42 and 54 to form tracks upon the surfaces of the associated work pieces that facilitate misaligning movement. This action is enhanced by the swivel connection of washers 18 and 36 with threaded shank 48 and shank 32, respectively. Also the fact that shank 32 is free to turn with respect to sleeve 30 is believed to contribute to this desirable improved clamping action.

Although nut 56 could be more rapidly moved into position along a coarse threaded portion 48 instead of a fine threaded portion 48, it has been found desirable to utilize a fine series thread on this shank. More specifically, the use of a fine series thread provides a lock action which can be applied manually through the eye bolt 46, the pressure exerted by hand on eye bolt 46 being greater utilizing a fine series thread. Because of the quick acting nature of nut 56 there is no loss in overall clamping efficiency. Despite this increased clamping pressure the improved washers 18 and 36 will not tend to creep out of proper clamping position. There is no tendency to form a groove and clamping pressures tending to resist rotation of the washers with respect to the work piece are exerted on each side of the square shaped peripheries 42 and 54.

Once the work pieces 68 and 70 have been clamped as explained above, nut 56 will hold screw 16 in operative clamping position. A lock action is further provided by the stop lug 50 acting against arm 22. This effective and rapid adjusting construction is achieved while maintaining sleeve 44 in a shape and size to give good support and bearing action for screw 16. In addition, substantially the full distance between the confronting edges of arms 20 and 22 is available for clamping action and to receive work pieces such as work pieces 68 and 70. This permits C-clamp 10 to clamp a wide range of thicknesses of work pieces without increasing the size of the C-clamp 10 or the distance between arms 20 and 22.

It will be seen that there has been provided a C-clamp which fulfills all of the objects and advantages of the invention set forth above. Although a preferred form of the invention has been shown for purposes of illustration, it is to be understood that various changes and modifications can be made therein without departing from the spirit and scope thereof. Accordingly, the invention is to be limited only as set forth in the following claims.

I claim:

1. A quick acting C-clamp comprising a frame including a pair of spaced apart arms, a first substantially cylindrical sleeve formed on one of said arms, a shank rotatably mounted within said first sleeve, a first clamping member swively mounted upon said shank, a second substantially cylindrical sleeve formed on the other arm and disposed with the axis thereof in alignment with the axis of said first sleeve, a threaded shank slidably received in said second sleeve, a second clamping member swively mounted on the end of said shank disposed toward said first clamping member, said first clamping member and said second clamping member being substantially the same size and having substantially square clamping surfaces including straight portions to resist rotation thereof with respect to associated work pieces, a threaded nut threadedly engaging said shank between said second clamping member and said second sleeve, the end of said second sleeve disposed toward said first sleeve and the edge of said other arm disposed toward said first sleeve lying substantially in the same plane, said nut having substantially plane sides disposed parallel to each other and parallel to the plane in which lie said second sleeve end and said other arm edge, and a stop lug mounted on the side of said nut disposed toward said second sleeve and extending toward said second sleeve and disposed radially outwardly beyond the surface of said second sleeve, said stop lug being adapted to contact said other arm when the adjacent side of said nut is disposed against said second sleeve whereby to stop rotation of said nut with respect to said frame thereby permitting said shank to be threadedly moved with respect to said nut toward said first clamping member.

2. A quick acting C-clamp comprising a frame including a pair of spaced-apart arms, a first clamping member mounted upon one of said arms, a substantially cylindrical sleeve formed on the other arm and disposed in general alignment with said first clamping member, a threaded shank slidably received in said sleeve, a rotatable clamping member mounted on the end of said shank disposed toward said first clamping member, a threaded nut threadedly engaging said shank between said rotatable clamping member and said sleeve, the end of said sleeve disposed toward said rotatable clamping member and the edge of said other arm disposed toward said one arm lying substantially in the same plane, said nut having substantially plane sides disposed parallel to each other and parallel to the plane in which lie said sleeve and said other arm edge, and a stop lug on the side of said nut disposed toward said sleeve and extending toward said sleeve and disposed radially outwardly beyond the surface of said sleeve, said stop lug being adapted to contact said other arm when the adjacent side of said nut is disposed against said sleeve whereby to stop rotation of said nut with respect to said frame thereby permitting said shank to be threadedly moved with respect to said nut toward said first clamping member.

References Cited in the file of this patent

UNITED STATES PATENTS

| | | |
|---|---|---|
| 291,248 | West | Jan. 1, 1884 |
| 1,732,081 | Clement | Oct. 15, 1929 |
| 1,849,805 | Raymond | Mar. 15, 1932 |
| 2,351,243 | Vetter | June 13, 1944 |

FOREIGN PATENTS

| | | |
|---|---|---|
| 878,334 | Germany | June 1, 1953 |